(12) United States Patent  
Kitani

(10) Patent No.: US 6,505,000 B2
(45) Date of Patent: Jan. 7, 2003

(54) CAMERA INCLUDING ELECTRONIC FLASH, CAMERA SHAKE DETECTING SYSTEM, AND POWER SUPPLY CONTROL FUNCTION FOR SAME

(75) Inventor: Kazunari Kitani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/899,214

(22) Filed: Jul. 6, 2001

(65) Prior Publication Data

US 2002/0006278 A1 Jan. 17, 2002

(30) Foreign Application Priority Data

Jul. 13, 2000 (JP) ........................ 2000-212822

(51) Int. Cl.[7] .................... G03B 15/05; G03B 17/00
(52) U.S. Cl. .................. 396/52; 396/206; 396/303
(58) Field of Search .................... 396/52–55, 205, 396/206, 176, 301, 303

(56) References Cited

U.S. PATENT DOCUMENTS

| | | | |
|---|---|---|---|
| 5,153,633 A | 10/1992 | Otani | 354/430 |
| 5,210,563 A | 5/1993 | Hamada et al. | 354/400 |
| 5,637,860 A | 6/1997 | Shiomi | 250/201.1 |
| 5,682,556 A | * 10/1997 | Iwane et al. | 396/55 |
| 5,864,722 A | 1/1999 | Aoki et al. | 396/263 |
| 6,256,457 B1 | 7/2001 | Miyamoto et al. | 396/52 |

FOREIGN PATENT DOCUMENTS

| | | | |
|---|---|---|---|
| JP | 7-281241 | 10/1995 | G03B/5/00 |

* cited by examiner

Primary Examiner—W. B. Perkey
(74) Attorney, Agent, or Firm—Fitzpatrick, Cella, Harper & Scinto

(57) ABSTRACT

A camera in which an electronic flash emits light includes a capacitor for accumulating charge used to cause the electronic flash to emit light, a camera shake detector for detecting camera shake, a power supply control circuit for controlling a power supply used for driving the camera shake detector, and a voltage detecting circuit for detecting a charging voltage level across the capacitor. When the voltage detecting circuit detects that the charging voltage level across the capacitor is greater than a predetermined voltage level which is set lower than a voltage at a time of completion of a charging operation of the capacitor, the power supply control circuit turns on the power supply used for driving the camera shake detector.

18 Claims, 5 Drawing Sheets

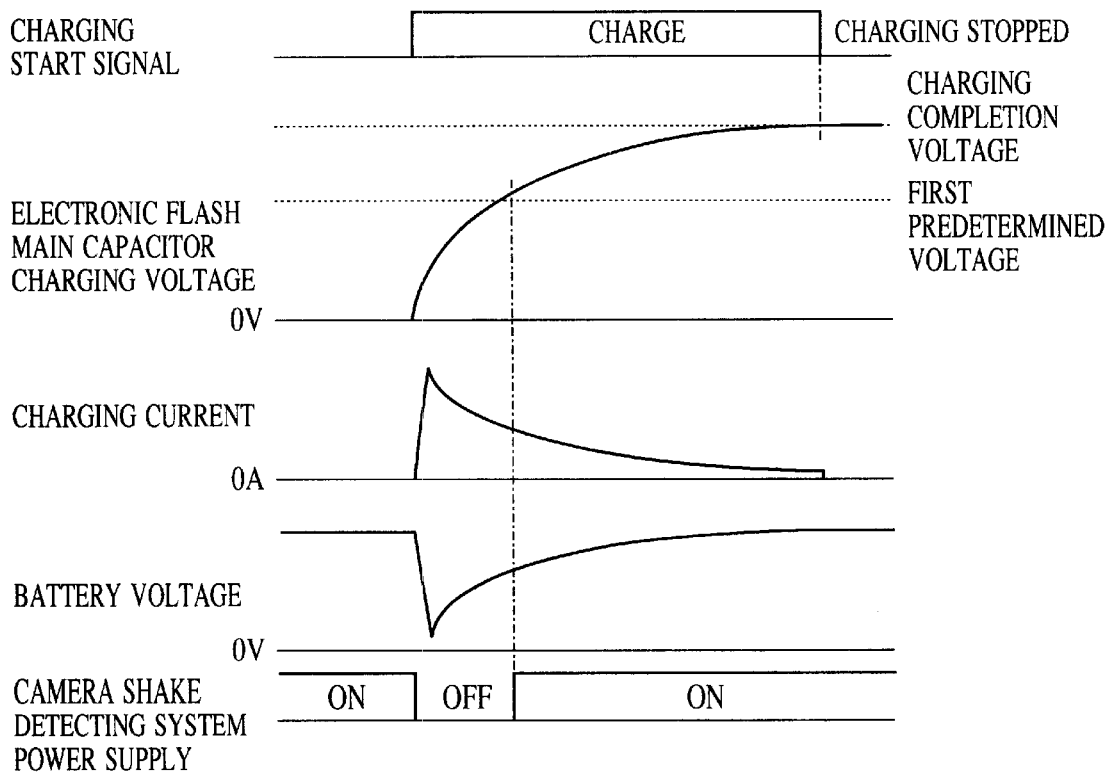
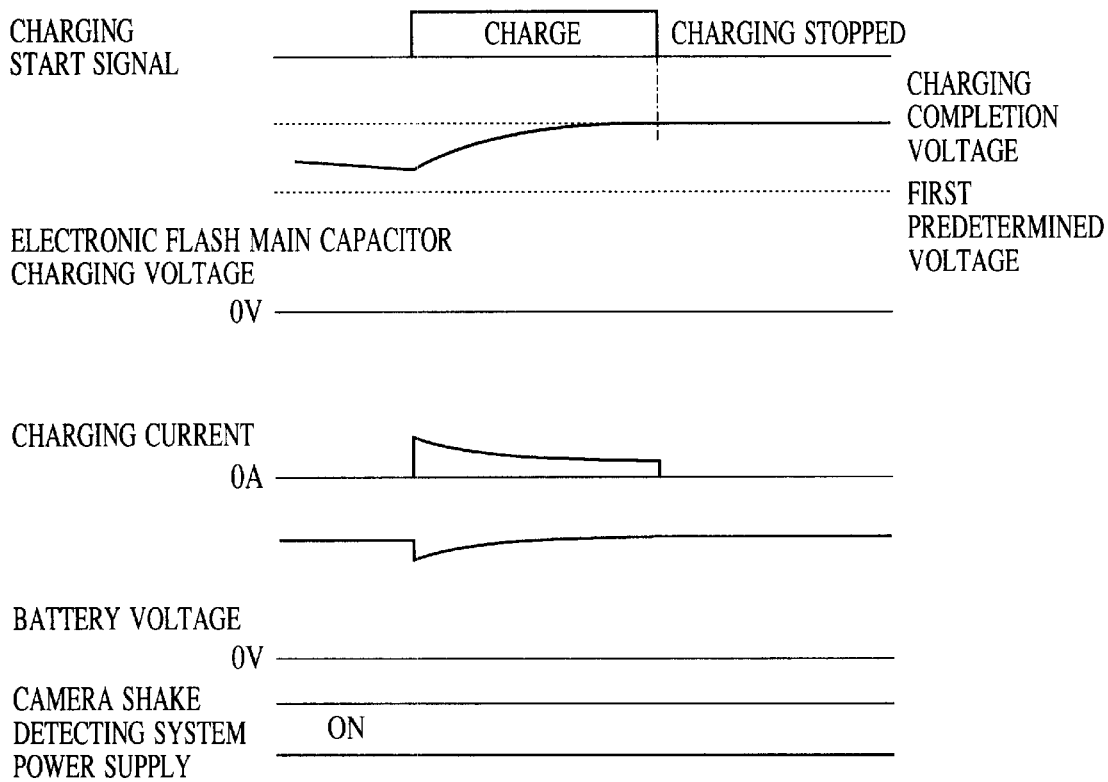

CAMERA INCLUDING ELECTRONIC FLASH, CAMERA SHAKE DETECTING SYSTEM, AND POWER SUPPLY CONTROL FUNCTION FOR SAME

BACKGROUND OF THE INVENTION

1. Field of the Invention

The present invention relates to a camera which includes an electronic flash and a shake detector, and, more particularly, to a camera which reduces time lag from a time after completion of a charging operation of a stroboscope to a time of an exposure operation by completing the charging operation of the electronic flash and starting a detection operation of camera shake at predetermined timings.

2. Description of the Related Art

In a single-lens reflex camera including a through-the lens (TTL) finder, the finder image is an image obtained after passage through a:camera shake correcting lens, so that the result obtained through the camera shake correcting lens can be confirmed in real time. Therefore, in a conventional single-lens reflex camera including a vibration isolator, the power supply to a camera shake detecting system is turned on while an ON/OFF switch for correcting camera shake is turned on, and the correcting lens is driven while a release switch is pressed halfway, that is, while a switch SW1 is turned on. In this state, the image obtained after correction by the camera shake correcting lens can be directly confirmed through the finder.

A driving circuit of a camera shake correcting lens and a camera shake detecting, system in such types of cameras are disclosed in U.S. Pat. Nos. 5,153,633, 5,637,860, and 5,864,722. In U.S. Pat. No. 5,153,633, the process after completion of a release operation carried out after a switch SW1 has been pressed is disclosed in U.S. Pat. No. 5,637,860, when a main switch SW is turned on, electrical power is supplied to a camera shake sensor, and correction of camera shake is started by depressing a release switch. When a predetermined period of time elapses without a release operation being carried out, the supply of electrical power to the camera shake detector (sensor) is stopped. In U.S. Pat. No. 5,864,722, correction of camera shake is started, and then is stopped after the passage of a predetermined amount of time.

The start-up time of a camera shake detecting sensor required for it to start performing a proper (reliable) output operation is in the range of from a few hundred milliseconds to a few seconds. Similarly, an integrator circuit of signal processing means requires a certain amount of time to operate stably. Therefore, when the operator starts/turns on the power supply after the release switch has been pressed, a problem arises in that a driving operation for performing precise correction cannot be carried out immediately after the release operation. Consequently, in these prior art systems, electrical current is supplied to the detector/sensor as early as possible and for a long period of time, and the driving operation of the correcting lens, which requires a large amount of electrical current, is minimally carried out only to the extent required.

In a lens shutter camera, whose finder and shooting optical system are separately formed, the effects of the camera shake correcting lens thereof cannot be confirmed through the finder, so that it is not necessary to drive the camera shake correcting lens while the release switch is pressed halfway, that is, while switch SW1 is pressed. In other words, it is not necessary to drive the camera shake correcting lens at any time other than a time immediately before and immediately after an exposure operation.

However, the battery capacity or the number of batteries used in a lens shutter camera is smaller than the capacity/number used in a single-lens reflex camera. Therefore, although a driving operation of the camera shake correcting lens, which requires a large amount of current, only needs to be carried out immediately before and immediately after an exposure operation, the amount of electrical power consumed by the camera shake detecting system becomes appreciable compared to the amount of electrical power consumed by other circuits of the lens shutter camera, when electrical power is supplied to the camera shake detecting system by turning on a main switch, and then is stopped after a certain period of time. Consequently, the loss of electrical power is large, thereby making it necessary to optimize the method of supplying electrical power.

For example, in a compact camera having an electronic flash (stroboscope) circuit, the battery voltage is excessively reduced during a charging operation of the electronic flash. A method of controlling the power supply to a camera shake detecting system during a charging operation of the electronic flash is disclosed in, for example, U.S. Pat. No. 5,210,563. U.S. Pat. No. 5,210,563 proposes not to use the output of the camera shake detecting system during a charging operation of the electronic flash because the reliability of the output cannot be maintained due to changes in the power supply voltage supplied to the camera shake detecting system during the charging operation of the electronic flash. For example, Japanese Patent Laid-Open No. 7-281241 proposes to prohibit a charging operation of the electronic flash during operation of the camera shake detecting system or to stop the operation of the camera shake detecting system when a determination is made that the battery used for making the stroboscope emit light is uncharged.

However, lens shutter cameras are becoming smaller, like the battery used, so that the load supplying capability of the power supply circuit cannot be made very large. Therefore, when the load supplying capability of the power supply circuit is taken into consideration, a method of restricting the amount of electrical power consumed by stopping the operation of the camera shake detecting system as a result of turning off the power supply to the camera shake detecting system during a charging operation of the electronic flash may be considered. For example, there is a sequence of steps for stopping operation of the camera shake detecting system by turning off the power supply to the camera shake detecting system during a charging operation of the electronic flash. More specifically, in this sequence, after an operation of the release switch, photometric operations and distant measurement are carried out. Then, after a determination has been made that the electronic flash needs to be charged, the power supply to the camera shake detecting system is turned off in order to charge the electronic flash. After completion of the charging operation, the power supply to the camera shake detecting system is turned on again. Using this method, it is possible to overcome a problem that the amount of electrical power becomes insufficient to operate the entire camera due to a reduction in the power supply voltage caused by the charging operation.

However, as described above, it is known that the start-up time required for the camera shake detecting sensor to start performing a proper (reliable) output operation is in the range of from a few hundred milliseconds to a few seconds, and that the integrator circuit and the filter circuit of the signal processing means require a certain amount of time to operate stably. Therefore, when the power supply to the camera shake detecting system is turned on after completion of a charging operation of the electronic flash, the camera shake detecting system requires time to operate stably after the completion of the charging operation of the electronic flash. Consequently, the period of time required from the time the release switch is actually pressed to the time the shutter is actually released becomes long. This period of time needs to be made shorter to improve efficiency of operation of the camera.

SUMMARY OF THE INVENTION

According to one aspect of this invention, by starting the supply of electrical power to a camera shake detecting system before a charging operation of a capacitor used to cause an electronic flash (stroboscope) to emit light is completed, the camera shake detecting system is brought into a state allowing it to perform a stable output operation when a charging operation of the electronic flash is completed. Therefore, camera shake is corrected using the detection results of the camera shake detecting system after a release switch has been pressed, thereby making it possible to reduce time lag before an exposure operation can be performed.

According to another aspect of this invention, when a charging voltage of a capacitor used to cause an electronic flash to emit light is equal to or less than a predetermined voltage level which is less than a voltage at a time a charging operation is completed, the supply of electrical power to a camera shake detecting system is stopped in order to make it possible to ensure the provision of a power supply voltage which allows stable driving of circuits other than that of the camera shake detecting system.

Further objects, features and advantages of the present invention will become apparent from the following description of the preferred embodiments with reference to the attached drawings.

BRIEF DESCRIPTION OF THE DRAWINGS

FIGS. 4A and 4B illustrate the operating states in the present invention.

DESCRIPTION OF THE PREFERRED EMBODIMENTS

Figure 1:
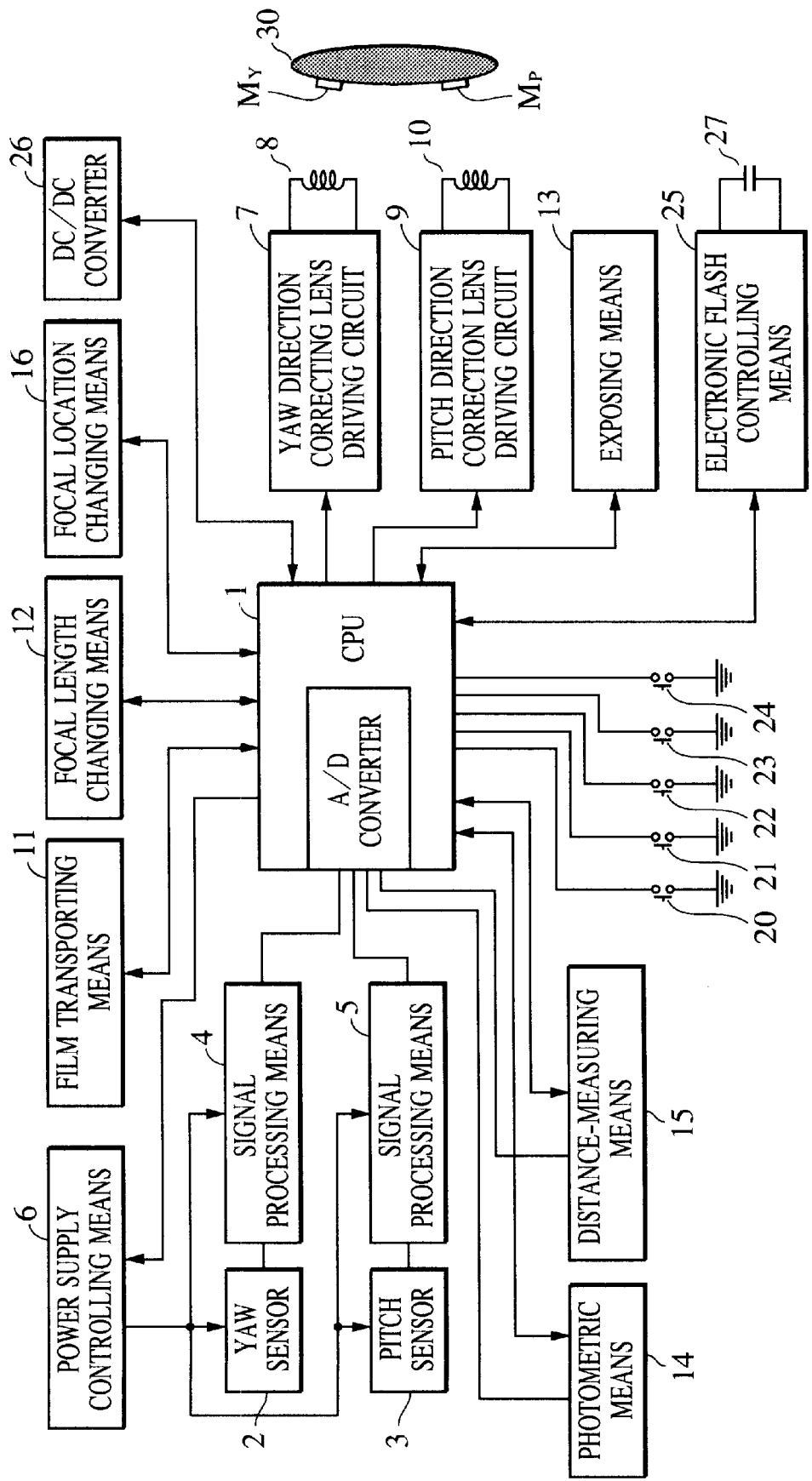
FIG. 1 is a block diagram of the circuits of a camera of an embodiment of the present invention.

FIG. 1 is a block diagram of various circuits of a camera of an embodiment of the present invention.

The embodiment of the present invention is described with reference to a lens shutter camera, whose shooting lens and finder have separate optical systems.

In FIG. 1, reference numeral 1 denotes a central processing unit (CPU) which incorporates an analog-to-digital (A/D) converter for controlling the operational sequence of the entire camera, including controlling of a camera shake correcting operation of a shooting lens. Reference numeral 2 denotes a camera shake detector/sensor, such as a vibratory gyroscope, for detecting angular speed (that is, camera shake) of the camera in a yaw direction. Reference numeral 3 denotes another camera shake detector/sensor, such as, a vibratory gyroscope, for detecting angular speed (that is, camera shake) of the camera in a pitch direction. Reference numeral 4 denotes signal processing means for filtering output from the yaw detector/sensor 2 regarding camera shake in the yaw direction in order to convert the output from the yaw detector/sensor 2 to a displacement of the camera in the yaw direction resulting from camera shake. Reference numeral 5 denotes another signal processing means for similarly converting the output from the pitch detector/sensor 3 regarding camera shake in the pitch direction to a displacement of the camera in the pitch direction resulting from camera shake. Reference numeral 6 denotes power supply control means for controlling the supply of electrical power to the camera shake detecting detectors/sensors 2 and 3 and to the camera shake signal processing means 4 and 5. Reference numeral 7 denotes a yaw-direction correcting lens driving circuit (driver) for correcting camera shake of a shooting optical system in the yaw direction by driving a camera shake correcting lens 30, disposed inside the shooting optical system, in the yaw direction by supplying electrical current to a yaw-direction driving coil 8 opposing a magnet My secured to the camera shake correcting lens 30. Reference numeral 9 denotes a pitch-direction correcting lens driving driver for correcting camera shake of the shooting optical system in the pitch direction by driving the shake correcting lens 30, disposed inside the shooting optical system, in the pitch direction by supplying electrical current to a pitch-direction driving coil 10 opposing a magnet Mp secured to the camera shake correcting lens 30. Reference numeral 11 denotes film transporting means for detecting information concerning whether or not a film is loaded in the camera and specific information of films loaded in the camera, and for winding up and rewinding the films. Reference numeral 12 denotes focal length changing means (driver) for driving a zoom motor to a desired position. The zoom motor is used to change the focal length of a shooting lens in response to the user toggling (turning on/off) a wide angle/telephoto switch. Reference numeral 13 denotes exposure means, such as a shutter, for exposing the film by a desired amount. FIG. 14 denotes photometric means for setting the amount of desired exposure. Reference numeral 15 denotes distance-measuring means, such as a range finder, for measuring the distance to a subject/object. Reference numeral 16 denotes focal location changing means for adjusting the location of a focusing lens of the shooting lens so that the focus is proper. Reference numeral 20 denotes a main switch. Reference numeral 21 denotes a switch SW1 which is switched "on" when a release switch is pressed half way. Reference numeral 22 denotes a switch SW2 which is switched "on" when a release switch is pressed completely. Reference numeral 23 denotes a teleswitch for moving the focal length of the shooting optical system to the telephotographic side. Reference numeral 24 denotes a wide angle switch for moving the focal length of the shooting optical system to the wide-angle side. Reference numeral 25 denotes electronic flash controlling means for controlling the operation of an electronic flash (stroboscope). Reference numeral 26 denotes a DC/DC converter for stepping up the voltage of a battery, and for supplying a predetermined voltage to circuits inside the camera, such as the CPU 1, the shaking detectors/sensors 2 and 3, the signal processing means 4 and 5, and so on. Reference numeral 27 denotes a main capacitor for accumulating charge used to cause the electronic flash to emit light.

Figure 2:
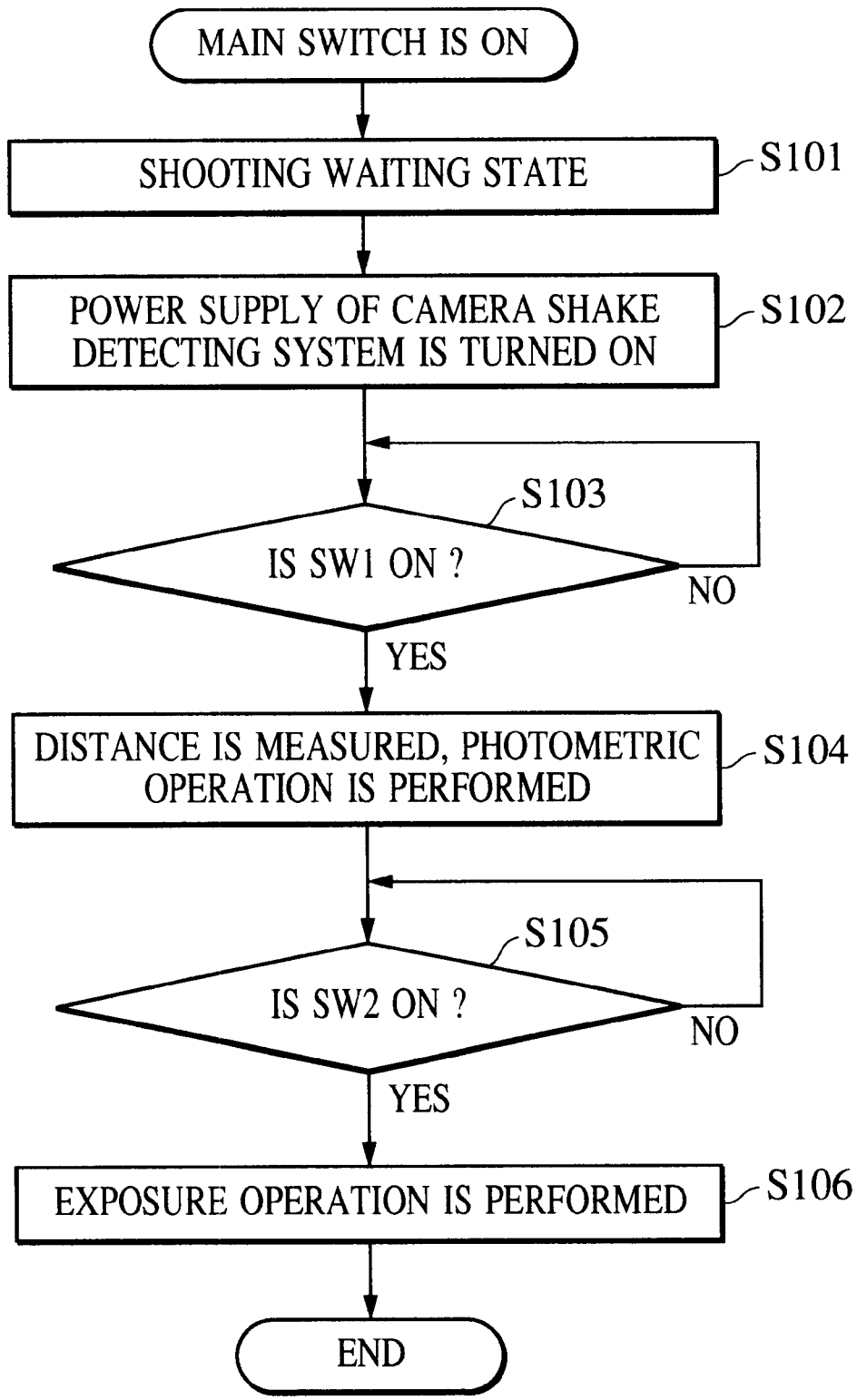
FIG. 2 is a flowchart of the steps of a vibration isolation controlling process in the camera of the embodiment of the present invention.

A description of the sequence of the steps carried out for a typical vibration isolation controlling process will now be given with reference to FIGS. 1 and 2.

In the present embodiment, a change-over switch for switching between a state for executing a shake correction operation and a state for not executing the shake correction operation is not provided. In other words, an embodiment will basically be described for the case where the camera is set in a state capable of performing a shake correction operation at all times when necessary. When the main switch is turned off, it will be assumed that the power supply to the camera shake detectors/sensors 2 and 3 and the signal processing means 4 and 5 (hereinafter referred to as the "shake detecting system") is turned off.

A simple description of the case where the power supply to the camera is switched from the OFF state to the ON state as a result of operating the main switch of the camera will be given. Here, in Step 101, the CPU 1 starts the DC/DC converter 26 in order to check whether or not there is any abnormality in any of the circuit blocks and any anomalies in the battery voltage of the camera. If there are no abnormalities or anomalies, the camera is set in a shooting waiting state.

In Step 102, the power supply of the camera shake detecting system (the camera shake detectors/sensors 2 and 3, and the signal processing means 4 and 5) is turned on. When the power supply to thee camera shake detecting system is turned on, the power supply controlling means 6 is driven, thereby supplying electrical power to the shake detectors/sensors 2 and 3 and the signal processing means 4 and 5. Due to their structures, the camera shake detectors/sensors 2 and 3 require a few hundred milliseconds to a few seconds to start up, that is, to start performing output operations at predetermined angular speeds. In the signal processing means 4 and 5, which include DC cut filters, low-pass filter circuits having large time constants, and integrator circuits, a certain amount of time is required for these circuits to start performing effective (stable, reliable) output operations. Therefore, in the case where the supply of electrical power is started after pressing the switch SW2, a precision driving operation cannot be realized immediately after pressing the switch SW2. Consequently, in Step 102, the power supply of the camera shake detecting system is kept in the "on" state in order to supply electrical power to the camera shake detectors/sensors 2 and 3 and the signal processing means 4 and 5 before the release switch is pressed to carry out a shooting operation.

In Step 103, when the switch SW1 is turned on as a result of pressing the release switch half way, Step 104 is carried out in order to operate the distance-measuring means 15 and the photometric means 14 of the camera, and, based on the obtained distance information, the focal location changing means 16 changes the relative location of the focus lens so that proper focus is achieved. When in Step 105 the switch SW2 is turned on as a result of completely pressing the release switch, Step 106 is carried out in order to calculate the proper exposure time based on information concerning the brightness of a subject obtained by the photometric means 14 and information regarding the sensitivity of the film previously obtained by the film transporting means 11, so that the exposure means 13 is driven to perform an exposure operation. The angular speeds of the camera in the yaw direction and the pitch direction, which are produced with the movement of the hands of the photographer, obtained from the detectors/sensors 2 and 3 during the exposure operation are detected. By performing filtering and integration operations for each of the yaw and pitch directions by the corresponding signal processing means 4 and 5, the angular displacements due to shake are obtained. Based on the obtained angular displacements, the CPU 1 calculates target values by a known method in order to control the yaw-direction correcting lens driving circuit 7 and the pitch-direction correcting lens driving circuit 9, so that the correcting lens located in the shooting lens is driven, as a result of which the camera shake caused by the photographer during the exposure operation is corrected.

In some conventional cameras not having a shake correcting function, in order to restrict electrical power consumption, the supply of electrical power to each of the circuit blocks is stopped when an operating switch or the like is not operated for a certain period of time. In such cameras, the CPU itself is made to operate at a low speed or is stopped with only a clock counter being operated.

However, in cameras having a camera shake correcting function, although the CPU 1 itself can start operating after a period of time of the order of a few milliseconds from the stopped state thereof by an external interruption, such as when an operating switch or the like is toggled, the camera shake detectors/sensors 2 and 3 and the signal processing means 4 and 5 require in the range of a few hundred milliseconds to a few seconds to output normal values, as mentioned above. Therefore, from the viewpoints of reducing operating time and electrical power consumption, it is believed that the supply of electrical power to the shaking detectors/sensors 2 and 3 and to the signal processing means 4 and 5 can be efficiently controlled when it is carried out independently of the control of the operating states of the CPU 1 and the other circuit blocks.

Figure 3:
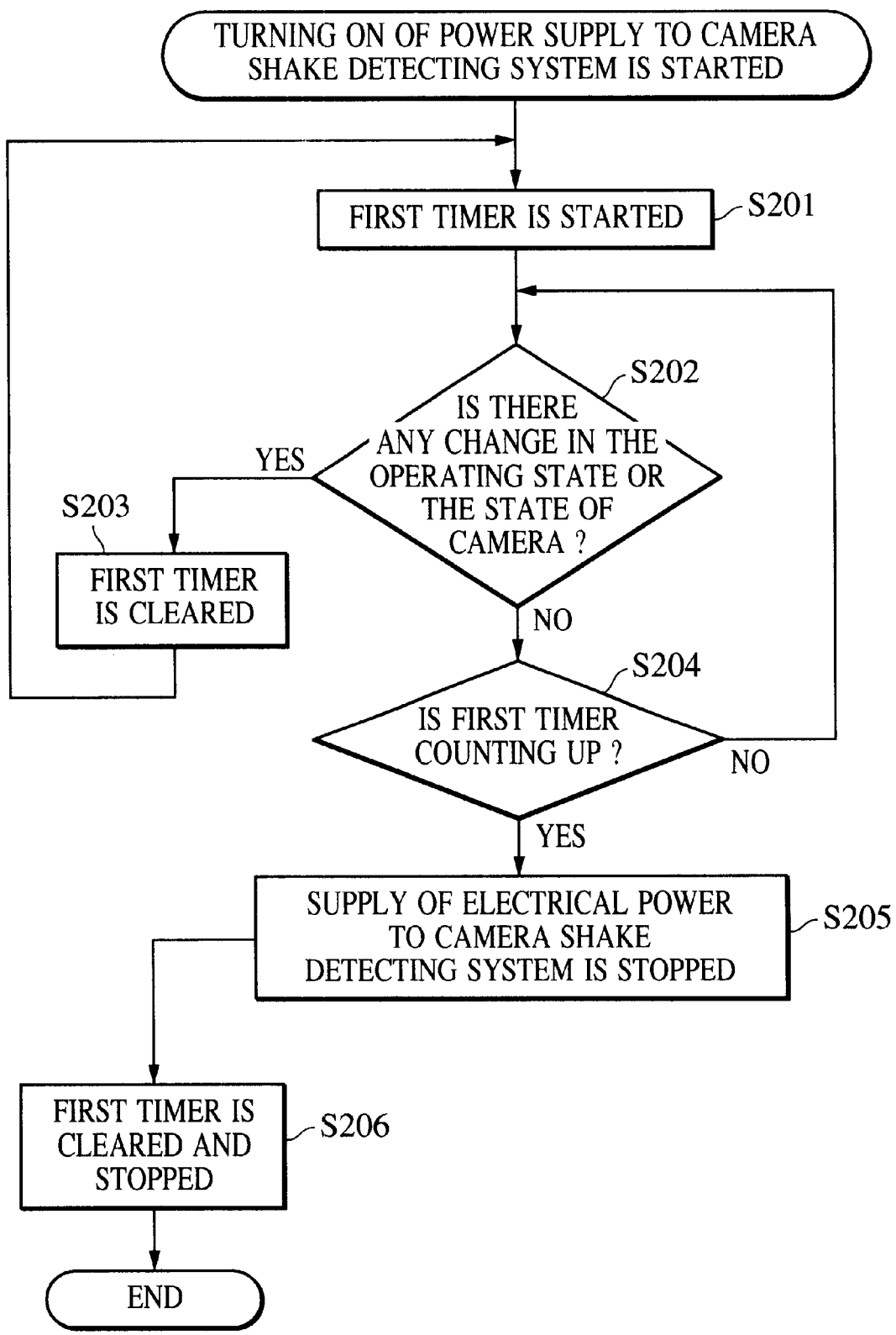
FIG. 3 is a flowchart of steps for controlling a power supply of a camera shake detecting section in the camera of the embodiment of the present invention.

A simple description of the control of the power supply to the camera shake detecting system will now be given with reference to FIG. 3. When the CPU 1 determines that it is necessary to turn on the power supply to the shake detecting system as a result of detecting, for example, that the operating switch is pressed, the CPU 1 drives the power supply controlling means 6 in order to supply electrical power to the shake detecting system (that is, the shake detectors/sensors 2 and 3,-and the signal processing means 4 and 5).

When electrical power is supplied to the camera shake detecting system, angular displacements in accordance with movement imparted to the camera by the hands of the photographer are detected and output. At the same time that the electrical power is supplied, in Step 201 the CPU 1 starts a first timer inside the CPU 1 in order to measure the period of time from the start of the supply of electrical power.

Here, a second timer for controlling the operation/stopping of the CPU 1 following the starting of the first timer may be provided. In this case, when an operating switch or the like is not operated by a user before a predetermined period of time has elapsed, as measured by the second timer, the power supply to circuits other than the power supply to the circuits of the camera shake detectors/sensors 2 and 3 and the signal processing means 4 and 5 are stopped, and the CPU 1 is stopped with only the first timer being set in operation. When any operation of, for example, a switch, is executed, an interrupt operation is immediately introduced, so that the CPU 1 must be set so as to start up and to change its state from the ON state to the OFF state.

In Step 202, a determination is made as to whether or not any operation has been executed or whether or not there has been any change in the state of the camera, after starting the supply of electrical current to the camera shake detectors/sensors 2 and 3 and the signal processing means 4 and 5. When any operation has been executed or when there has been any change in the state of the camera before the first timer executes a count, the process proceeds to Step 203 in order to clear the first timer and restart it. Thereafter, the process goes back to Steps 201 and 202.

In Step 202, when a determination is made that no operation has been carried out or that there has been no change in the state of the camera, the process proceeds to Step 204 in order to determine whether or not the timer is counting up.

In Step 204, when a determination is made that the first timer is counting up, a determination is made in Step 205 that the standby state of the vibration isolation operation does not need to be maintained for the time being. The power supply controlling means 6 stops the power supply to the camera shake detecting system (that is, the camera shake detectors/sensors 2 and 3 and the signal processing means 4 and 5) in order to stop operation of the DC/DC converter 26.

After the power supply to the camera shake detecting system has been stopped in Step 205, the CPU 1 in Step 206 stops the first timer in order to end the routine.

By carrying out these steps, the power supply to the camera shake detecting system is turned on prior to the time when a shooting operation needs to be carried out, thereby making it possible to achieve ease of operation, and to reduce consumption of the battery by turning off the power supply when, for example, an operation is not carried out for a certain period of time.

A description of the case where a determination is made that the electronic flash needs to emit light will now be given.

When the release switch 21 is operated before the first timer counts up while the power supply to the camera shake detecting system is turned on, the focal location changing means of the camera changes the focal location of the shooting lens so that the focus is set at the proper location based on the distance information obtained by the distance-measuring means 15. Then, when a determination is made that the electronic flash needs to emit light based on the information of the brightness of the subject obtained by the photometric means and the information of the sensitivity of the film, the CPU 1, through the electronic flash controlling means 25, detects the voltage level across the main capacitor 27 of the electronic flash (the "charging voltage"). When a charging voltage level required (sufficient) to emit light is detected, an exposure operation is started, an,d the electronic flash is made to emit light at a predetermined timing through operation of the electronic flash controlling means 25. When the detected charging voltage level is sufficient, the CPU 1 sends a charging start command to the electronic flash controlling means 25 in order to start a charging operation of the electronic flash main capacitor 27. Thereafter, when the charging voltage level reaches a predetermined value, the camera waits for an exposure operation.

In the case where the electronic flash is being charged, in general, a large amount of current rapidly charges the capacitor at the initial stage of the charging operation when the capacitor is virtually not charged at all. As the charging voltage level across the capacitor increases, the charging current tends to decrease. Here, the battery voltage level changes with the charging current, so that at the initial stage of a charging operation the voltage level is greatly reduced, and is gradually recovered as the charging current decreases.

This situation is shown in FIG. 4A.

It is true that at the initial stage of the charging operation, the battery voltage drops because in this initial stage the charging voltage level across the electronic flash main capacitor 27 is low. However, in the case where the charging operation is started when the voltage level across the main capacitor 27 is equal to or greater than a certain voltage level, or in the case where, even when the charging voltage level is low, the charging voltage level across the main capacitor 27 is made to exceed a certain voltage level by carrying out a charging operation for a certain period of time, the voltage level of the battery is sufficiently recovered for the battery to act as a power supply. When the charging current is low, a certain amount of time is required for completion of the charging operation of the main capacitor 27.

In FIG. 4A, when the charging voltage level of the electronic flash main capacitor 27 is equal to or less than a first predetermined voltage level, after the CPU 1 has turned off the power supply to the camera shake detecting system by operation of the power supply controlling circuit 6, it sends a charging start command to the electronic flash controlling means 25. This causes a charging operation of the electronic flash main capacitor 27 to be started. Since the initial charging voltage level of the main capacitor 27 is low, when the charging operation of the main capacitor 27 is started, at first, a large amount of charging current flows, causing the battery voltage to drop greatly.

Thereafter, as the charging voltage level increases, the charging current decreases, so that the battery voltage level is recovered. When the electronic flash controlling means 25 detects that the charging voltage level of the main capacitor 27 has exceeded the first predetermined voltage level as a result of a continuing charging operation, the power supply controlling means 6 again turns on the power supply to the camera shake detecting system in order to start the required computing operation.

The first predetermined voltage level is determined by, for example, the type of battery used in the camera, factors related to the structure of the electronic flash circuit, including the capacity (capacitance) of the main capacitor 27, the structure of the DC/DC converter used, and the power consumption of devices inside the camera. When the charging voltage level of the main capacitor 27 exceeds the first predetermined voltage level, it can be guaranteed at least at this time that the main capacitor 27 has the capability of stably supplying electrical power to all of the operating devices inside the camera. Therefore, the predetermined voltage level is basically determined by the circuit structures. However, by changing the predetermined voltage level in accordance with, for example, the results of the detection of the battery voltage level carried out by checking the battery, a more accurate determination can be made.

When the charging operation of the main capacitor 27 is continued, and the CPU 1 detects that the charging voltage level thereof has reached a predetermined charging completion voltage level, the CPU 1 sends a charging stop command to the electronic flash controlling means 25 in order to stop the charging operation. This causes the battery voltage to be substantially restored to its level prior to the start of the charging operation. It is desirable that the waiting time for obtaining stabilization of the camera shake detectors/sensors 2 and 3 and, for example, the integrator circuits and the filters inside the signal processing means 4 and 5 ends by the time the charging voltage reaches the charging completion voltage level after the charging voltage level of the electronic flash main capacitor 27 has reached the predetermined voltage level and the power supply of the camera shake detecting system has been turned on. Even if this were not true, however, and the camera shake detecting system was supplied with power later, compared to the case where the power supply to the integrator circuits and the camera shake detectors/sensors 2 and 3 are turned on after completion of the charging operation, a shooting operation can be carried out earlier at least by an amount of time corresponding to this amount of time.

On the other hand, in the case where time elapses without the emission of light even when the electronic flash capacitor has been previously charged, the charge accumulated in the capacitor naturally dissipates/discharges, so that the charging voltage level gradually decreases with time compared to the case where the charging operation is completed. Accordingly, in the case where a charging operation is started when the charging voltage level has been reduced by natural discharge after a prior charging operation has been completed, the amount of charging current is small, so that a decrease in the battery voltage level during the charging operation is small, and the time required for the charging operation is made considerably shorter.

This situation is shown in FIG. 4B.

For example, when the charging voltage level of the electronic flash main capacitor 27 exceeds the first predetermined voltage level before the start of a charging operation, the CPU 1 sends a charging start command to the electronic flash controlling means 25 without giving out a command to the power supply controlling means 6 for turning off the power supply of the camera shake detecting system. Since the charging voltage level of the electronic flash main capacitor 27 is already high, not much charging current flows, so that the battery voltage level does not decrease much. Since the period of time required until the completion of the charging operation is short, the charging voltage level immediately reaches the charging completion voltage, so that the charging operation is stopped.

In this case, since the power supply to the camera shake detecting system is kept in the "on" state from a time prior to the state of a charging operation, the camera shake detecting system is in a normal (stable) operating state even when an exposure operation is started immediately.

Figure 5:
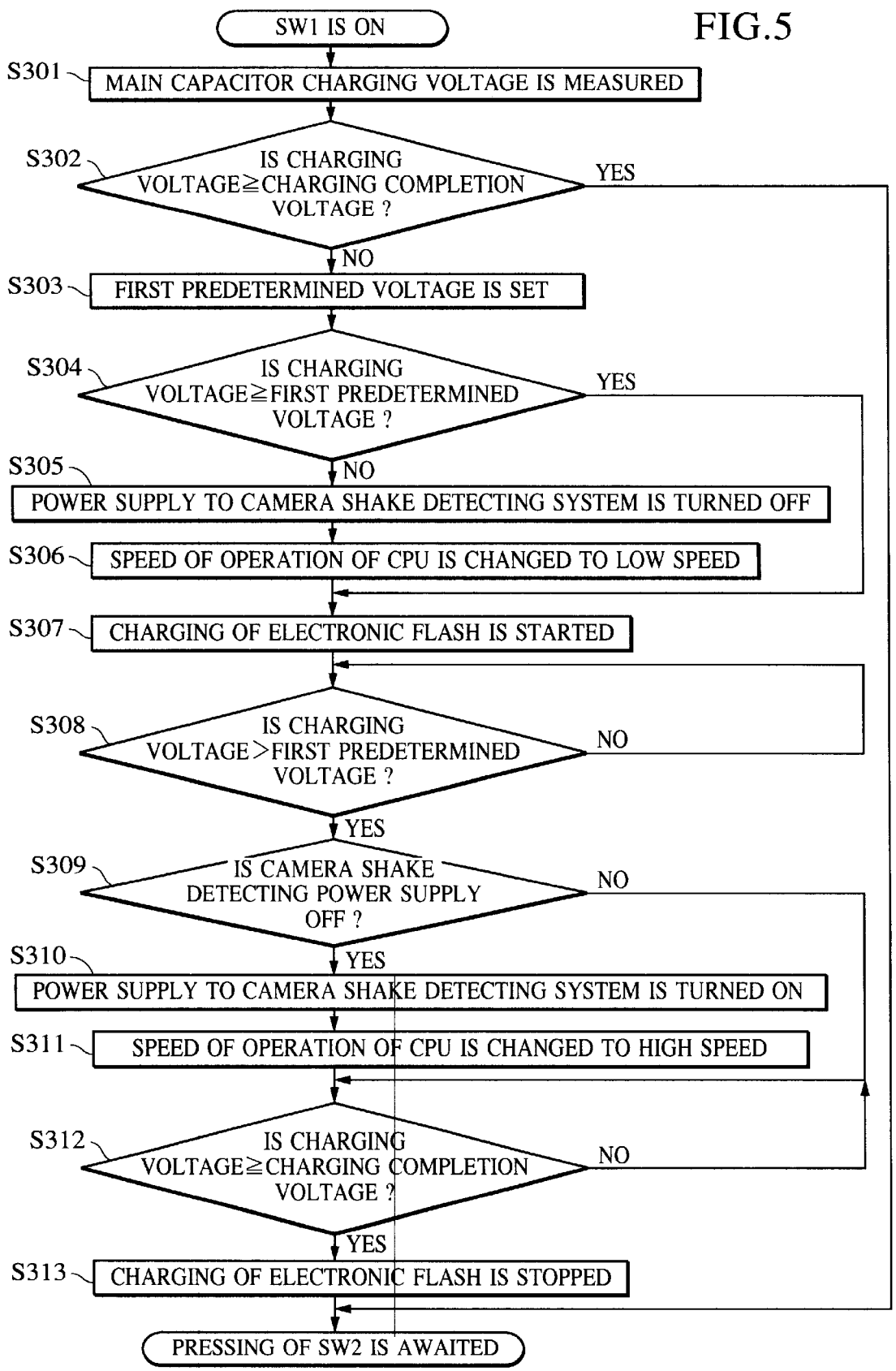
FIG. 5 is a flowchart of steps from the beginning to the end of a charging controlling process.

Hereafter, a description of steps carried out from the start of a charging control process to the end of the charging control process will be given with reference to the flowchart shown in FIG. 5.

The sequence of steps is started when a determination is made that an electronic flash light emission is required, based on information relating to the sensitivity of the film and information relating to the brightness of the subject obtained by the photometric means after the release switch has been pressed.

It is assumed that when a known battery checking operation is executed at the time of a start operation, before entering into the sequence of steps, the minimum amount of battery capacity required to carry out the sequence of operations of the camera described below can be ensured by carrying out the known battery checking operation.

In Step 301, the present charging voltage level of the electronic flash capacitor is measured.

In the method of measuring the present charging voltage level, for example, a plurality of resistors, connected in series inside the electronic flash controlling means 25, are connected in a parallel arrangement with the electronic flash capacitor, and a resistive potential divider used for a detecting operation is connected to the A/D converter of the CPU 1 in order to perform A/D conversion. The result of the A/D conversion is used for determining whether or not the result is equal to or greater than the predetermined voltage level.

In Step 302, when it is determined that the charging voltage level is already at the charging completion voltage level, and, when for some reason the electronic flash has not emitted light even when, for example, the electronic flash was charged immediately before this time, the charging sequence is ended. If the charging voltage level is not at the charging completion voltage level, the process proceeds to Step 303.

In Step 303, the power supply to the camera shake detecting system is set at the first predetermined voltage level that allows the power supply to be turned on again, with this first predetermined voltage level serving as a comparison reference value for determining the charging voltage level across the capacitor inside the electronic flash controlling means 25. Here, the first predetermined voltage level is obviously lower than the electronic flash charging completion voltage. As in Step 301, in Step 303, when a method using an A/D converter of the CPU 1 is used, data corresponding to the first predetermined voltage level as a value for comparison with the result obtained at the A/D converter is provided.

In the next Step 304, the result detected in Step 301 is compared with the first predetermined voltage level. This can be carried out by comparing the result of the A/D conversion at the CPU 1 with the previously provided data.

Hereafter, the case where the CPU 1 has determined that the present charging voltage level is equal to or less than the first predetermined voltage level will be considered.

In this case, a large amount of charging current is supplied when the subsequent charging operation of the electronic flash circuit is carried out, so that a considerable decrease in the battery voltage level is expected to occur. In order to maintain the output voltage of the DC/DC converter at a level that allows stable operation of all of the circuits during this time, it is necessary to reduce the load current of the DC/DC converter. Therefore, in Step 305, the power supply to the camera shake detectors/sensors 2 and 3 and the signal processing means 4 and 5, which consume a relatively large amount of current, is temporarily stopped. At the same time, commands for turning off the power supply to circuit blocks and devices that do not need to be operated are sent in order to reduce the amount of electrical current consumed. At this time, in Step 306, in order to reduce the amount of electrical current consumed by the CPU 1, itself, the load current of the DC/DC converter is reduced by reducing the operating speed of the CPU 1.

On the other hand, in Step 304, when the CPU 1 determines that the present charging voltage level is equal to or greater than the first predetermined voltage level, it determines that the reduction of the battery voltage level by the charging current does not have any effect on the operation of the DC/DC converter, so that the power supply to the camera shake detectors/sensors 2 and 3 is kept on. In addition, the required calculations of the camera shake detectors/sensors 2 and 3 are carried out without switching the operation speed of the CPU 1.

Thereafter, regardless of the determination made in Step 304, in Step 307 a charging command is sent to the electronic flash controlling means 25. By this command, the electronic flash controlling means 25 starts a charging operation.

Then, in Step 308, the voltage level across the main capacitor 27 during the charging operation is monitored in order to determine whether or not the charging voltage across the capacitor 27 has exceeded the first predetermined level again by comparing the data set in Step 303 and the results of the A/D conversion executed by the A/D converter built in the CPU 1 with each other. When, in Step 304, the CPU 1 determines that the charging voltage level is higher than the first predetermined value, the process immediately leaves this step and proceeds to the next step. On the other hand, when, in Step 304, the CPU 1 determines that the charging voltage level is less than the predetermined first voltage level before the start of a charging operation, the charging operation is continued, and the detecting operation is repeated until the charging voltage level reaches the first predetermined level. During this time, the CPU 1 waits for the voltage level across the main capacitor 27 to reach the first predetermined voltage level.

In Step 308, when the CPU 1 detects that the charging voltage level has reached the first predetermined voltage level, it determines that the reduction of the battery voltage subsequent to the detection is small. In the case where in Step 304 it has been determined that the charging voltage level is not at the first predetermined voltage level, when in Step 309 it is determined that the power supply to the camera shake detecting system has been stopped, the process proceeds to Step 310. If it has been determined in Step 304 that the charging voltage level is equal to or greater than the first predetermined voltage level, the power supply to the camera shake detecting system is already "on," so that the operating clock of the CPU 1 is kept at a high speed. Therefore, the process proceeds to Step 312.

In Step 310, the power supply to the camera shake detecting system is turned on to restart the required calculations. In Step 311, the operating speed of the CPU 1 is switched to a higher speed in order to wait for completion of the charging operation of the electronic flash circuit 27.

Next, in Step 312, the CPU 1 determines whether or not the charging voltage level of the electronic flash circuit has reached a predetermined completion voltage level. As in Step 304, this is determined using the results obtained by A/D conversion. Here, the comparison reference data is the charging completion voltage data.

In Step 312, when the CPU 1 detects that the charging voltage level of the electronic flash circuit has reached the predetermined completion voltage level, it sends in Step 313 a charging stop command to the electronic flash controlling circuit 25 in order to stop the charging operation.

This ends the description of the sequence of the charging control process of the electronic flash.

Thereafter, the states of the switches are checked. When switch SW1 alone is' pressed, the calculations of the shake detectors/sensors 2 and 3 are continued in order to prepare for the user pressing the release switch SW2 subsequent to the calculations. Thereafter, when the CPU 1 detects that the switch SW2 has been pressed, driving of the camera shake correcting lens is started so as to correct camera shake (caused by movement of the hands of the photographer) detected by the shake detectors/sensors 2 and 3. In accordance with the results previously obtained by the photometric means, the shutter is driven and the electronic flash emits Light at a predetermined timing. After a predetermined period of time, the shutter is closed and correction driving of the camera shake correcting lens is stopped. This completes the exposure of one frame. Then, the transporting means winds up the film by an amount corresponding to one frame. If this is the last frame, the transporting means performs a winding operation in order to complete the shooting of one frame. Thereafter, the power supply of the sensors is controlled in order to wait in a low electrical current consumption mode.

In Steps 308 and 312, when the CPU 1 determines whether or not the charging voltage level has reached the predetermined voltage level, the amount of time that has elapsed is measured at the same time. When the charging voltage level does not become greater than the predetermined voltage level within a predetermined period of time, the CPU 1 determines that there is an abnormality, and sends a charging stop command to the electronic flash controlling circuit 25 in order to give an indication of a warning. For the sake of simplicity, this has not been discussed in detail when describing Steps 308 and 312.

The relationship between the charging voltage level of the electronic flash and the voltage level of the battery varies greatly with, for example, the form of the charging circuit, the capacity/capacitance of the main capacitor 27 of the electronic flash, and the capacity/voltage level of the battery, so that it needs to be examined through combinations of individual circuit structures. However, by properly setting the first predetermined voltage level, the battery voltage level can be efficiently used, so that the battery can operate stably as a power supply.

In the case where the first predetermined voltage level is properly set, even when a battery which is in good condition and has a short charging time is used, it is possible to provide a certain amount of time prior to the time the charging voltage reaches the charging completion level after turning on the power supply to the camera shake detectors/sensors 2 and 3 and the signal processing means 4 and 5 has been turned on when the charging voltage has become greater than the first predetermined voltage. If the camera is constructed so that operation of the camera shake detectors/sensors 2 and 3 is started within this provided amount of time, it is possible to detect precise camera shake detector/sensor outputs at least after completion of the charging operation. In order to provide this sufficient amount of time, it is desirable that the first predetermined voltage level be less than the minimum voltage required to cause the electronic flash to emit light.

In addition, if either the stabilization time of the integrator circuits or the stabilization time of the filter circuits is set within the provided time, it is possible to detect precise outputs concerning angular displacements measured by the camera shake detecting system immediately after completion of the charging operation. If the camera is constructed so as to include all of the time periods within the provided amount of time, the camera shake correcting lens can be properly controlled even if the supply of electrical current to the shutter is started immediately after completion of the charging operation of the electronic flash.

Even if the start-up time of the camera shake detectors/sensors 2 and 3 and the stabilization time of the integrator circuits or the filter circuits do not end by the time a charging operation is completed, the waiting time required until the correcting lens can be properly (stably, reliably) driven after the completion of charging operation can be made reliably shorter.

As can be understood from the foregoing description, although in the present embodiment the first predetermined voltage level for comparison with the electronic flash charging voltage and the voltage level for switching the operational clock of the CPU 1 are the same voltage level, first and second levels may be suitably (individually) selected in accordance with the operational range of each component part.

Although the same first predetermined voltage level is used as the voltage level for checking the level of the charging voltage in Step 304 prior to a charging operation of the electronic flash and as the voltage level for checking the voltage level in Step 308 during the charging operation of the electronic flash, the voltage value used for checking the voltage level in Step 308 may be a different (second) predetermined voltage level. For example, in the case where the charging voltage level and the voltage level for switching the operational clock of the CPU 1 are set at different (first and second) voltage levels, it is possible to perform precise setting operations in accordance with the amount of electrical current consumption in the circuits by setting the predetermined voltage levels serving as voltage checking levels in accordance with the operating clock speed of the CPU 1. In addition, the predetermined voltage levels can be changed in accordance with other factors. As described above, precise control operations can be carried out by changing the absolute value of each predetermined voltage level due to factors such as the battery voltage level.

When the CPU 1 itself is made to perform digital integration and digital filtering of the results of the outputs of the camera shake detectors/sensors, the signal processing means 4 and 5 can be provided within the CPU 1.

In Step 304, the charging voltage level across the capacitor is determined prior to starting a charging operation of the electronic flash. It is determined by A/D conversion because the CPU 1 is operating at a high speed. However, when the charging voltage level has not reached the first predetermined voltage level in Step 304, the CPU 1 is at a lower operating speed in Step 306, so that, when, in Step 308, the charging voltage is determined by A/D conversion, the time required for A/D conversion may be increased.

To overcome this problem, a comparator may be provided inside the electronic flash controlling circuit so that the CPU 1 can make a determination in a shorter time. In addition, a D/A converter which is used to set a standard voltage value and which is controlled by the CPU 1 may be provided. When these comparators are provided, the first predetermined voltage level can be arbitrarily set, and the time required for the CPU 1 to make a determination is decreased, so that the camera can be expected to operate with high precision and at a high speed.

Obviously, when these comparators which can arbitrarily set reference values for comparison are provided, these comparators may be used to determine the voltage level not only in Step 308 but also in other steps.

As can be understood from the foregoing description, according to the camera of the present invention, by turning on the power supply to the camera shake detecting system prior to completion of a charging operation of any electronic flash, it is possible to at least minimize any time lag from the time immediately after completion of the charging operation of the electronic flash to an exposure operation. Therefore, the invention is effective in providing the photographer with a satisfactory camera that is easy to operate.

When a large amount of current flows during the charging operation of the electronic flash, the power supply to the camera shake detecting system is stopped in order to prevent malfunctioning of the camera system, thereby increasing the reliability of the camera. In addition, even in the case where the electronic flash is charged, when a determination is made that the effects of a charging operation on the battery is small, the time lag until the time of an exposure operation can be minimized as a result of continuing the detecting operation of any camera shake without stopping the power supply to the camera shake detecting system. Therefore, the present invention is effective in providing the operator with a satisfactory camera that is easy to operate.

Since the turning on and off of the power supply to the camera shake detecting system is controlled in accordance with the battery voltage level and the electrical current consumption in the circuits, the invention is effective in making it possible to perform a control operation with high precision, to increase the reliability of the camera, and to provide the operator with a satisfactory camera which is easy to operate.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera in which an electronic flash emits light, the camera comprising:
   a capacitor that accumulates charge during a charging operation, the charge to be used to cause the electronic flash to emit light;
   a camera shake detector that detects camera shake;
   a power supply control circuit that controls the supply of power to the camera shake detector; and
   a voltage detecting circuit that detects a voltage level across said capacitor;
   wherein, when said voltage detecting circuit detects that the voltage level across said capacitor is lower than a voltage level at a time of completion of a charging operation and greater than a predetermined voltage level, said power supply control circuit supplies power to said camera shake detector.

2. A camera according to claim 1, wherein the power supply of the camera includes a battery, and the predetermined voltage level is set in accordance with a voltage level of the battery.

3. A camera according to claim 1, wherein the predetermined voltage level is set in accordance with a circuit structure of the camera.

4. A camera according to claim 1, wherein the predetermined voltage level is less than a minimum voltage level required to cause the electronic flash to emit light.

5. A camera according to claim 1, wherein the predetermined voltage level is set so that a time required to complete a charging operation when a voltage level across said capacitor has exceeded the predetermined voltage level is longer than a start-up time required for said camera shake detector to perform an output operation after the power supply to said camera shake detector has been turned on.

6. A camera according to claim 1, wherein the predetermined voltage level is set so that a time required for completing a charging operation when the voltage level across said capacitor has exceeded the predetermined voltage level is longer than a time required for said camera shake detector to produce a stable output after the power supply to said camera shake detector has been turned on.

7. A camera according to claim 1, wherein said voltage detecting circuit issues a command to said power supply control circuit when the voltage level across said capacitor is greater than the predetermined voltage level, and said power supply control circuit turns on the power supply used to drive said camera shake detector upon receiving the command.

8. A camera according to claim 1,
   wherein said voltage detecting circuit detects the voltage across said capacitor before a charging operation of said capacitor is started.

9. A camera according to claim 1, wherein when said voltage detecting circuit detects that the voltage level is lower than the predetermined voltage level, said power supply control circuit stops supplying power to said camera shake detector.

10. A camera in which an electronic flash emits light, the camera comprising:
- a capacitor that accumulate charge during a charging operation, the charge to be used to cause the electronic flash to emit light;
- an electronic flash control circuit that controls the charging operation;
- a camera shake detector that detects camera shake;
- a power supply control circuit that controls a power supply used to drive said camera shake detector; and
- a voltage detecting circuit that detects a voltage level across said capacitor;
- wherein, when said voltage detecting circuit detects that the voltage level across said capacitor is less than a first predetermined voltage level which is set lower than a voltage level at a time of completion of a charging operation, said power supply control circuit turns off the power supply used to drive said camera shake detector and said electronic flash control circuit starts the charging operation, and when said voltage detecting circuit detects that the voltage across said capacitor is greater than a second predetermined voltage level which is set lower than the voltage level at the time of completion of the charging operation, said power supply control circuit turns on the power supply used to drive said camera shake detector.

11. A camera according to claim 10, wherein the power supply of the camera includes a battery, and the first and second predetermined voltage levels are set in accordance with a voltage level or the battery.

12. A camera according to claim 10, wherein the first and second predetermined voltage levels are set in accordance with a circuit structure of the camera.

13. A camera according to claim 10, wherein the second predetermined voltage level is less than a minimum voltage level required to cause the electronic flash to emit light.

14. A camera according to claim 10, wherein the second predetermined voltage level is set so that a time required to complete a charging operation when the voltage across said capacitor has exceeded the second predetermined voltage level is longer than a start-up time required for said camera shake detector to perform an output operation after the power supply of said camera shake detector has been turned on.

15. A camera according to claim 10, wherein the second predetermined voltage level is set so that a time required to complete the charging operation when the voltage across said capacitor has exceeded the second predetermined voltage level is longer than a time required for said camera shake detector to produce a stable output after the power supply of said camera shake detector has been turned on.

16. A camera according to claim 10, wherein the first predetermined voltage level is equal to the second predetermined voltage level.

17. A camera according to claim 10, wherein said camera shake detector is a vibratory gyroscope.

18. A camera according to claim 10, wherein said voltage detecting circuit issues a first command to said power supply control circuit when the voltage level across said capacitor is less than the first predetermined voltage level, and said power supply control circuit turns off the power supply used for driving said camera shake detector upon receiving the first command, and said voltage detecting circuit issues a second command to said power control circuit when the voltage level across said capacitor is greater than the second predetermined voltage level, and said power supply control circuit turns on the power supply used to drive said camera shake detector upon receiving the second command.

* * * * *

UNITED STATES PATENT AND TRADEMARK OFFICE
CERTIFICATE OF CORRECTION

PATENT NO. : 6,505,000 B2  
DATED : January 7, 2003  
INVENTOR(S) : Kazunari Kitani It is certified that error appears in the above-identified patent and that said Letters Patent is hereby corrected as shown below:

Column 1,  
Line 31, "detecting, system" should read -- detecting system --; and  
Line 35, "disclosed in" should read -- disclosed. In --.

Column 6,  
Line 40, "3,-and" should read -- 3, and --.

Column 7,  
Line 45, "an,d" should read -- and --.

Column 11,  
Line 56, "Light" should read -- light --.

Column 13,  
Line 6, "the,operational" should read -- the operational --.

Column 15,  
Line 8, "accumulate" should read -- accumulates --; and  
Line 36, "or" should read -- of --.

Signed and Sealed this

Twenty-second Day of July, 2003

JAMES E. ROGAN  
*Director of the United States Patent and Trademark Office*